United States Patent
Dairiki et al.

(10) Patent No.: US 11,593,924 B2
(45) Date of Patent: Feb. 28, 2023

(54) VIDEO SIGNAL PROCESSING DEVICE AND VIDEO SIGNAL PROCESSING METHOD

(71) Applicant: JVCKENWOOD Corporation, Yokohama (JP)

(72) Inventors: Takeshi Dairiki, Yokohama (JP); Ryosuke Nakagoshi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 185 days.

(21) Appl. No.: 17/118,773

(22) Filed: Dec. 11, 2020

(65) Prior Publication Data
US 2021/0192683 A1 Jun. 24, 2021

(30) Foreign Application Priority Data
Dec. 19, 2019 (JP) ............................ JP2019229142

(51) Int. Cl.
*G06T 5/00* (2006.01)
*H04N 9/64* (2006.01)
*H04N 9/73* (2006.01)

(52) U.S. Cl.
CPC ............. *G06T 5/009* (2013.01); *H04N 9/646* (2013.01); *H04N 9/73* (2013.01)

(58) Field of Classification Search
None
See application file for complete search history.

(56) References Cited

U.S. PATENT DOCUMENTS

| | | | | |
|---|---|---|---|---|
| 2015/0002904 A1* | 1/2015 | Nakamura | ........... | H04N 1/4074 |
| | | | | 358/3.01 |
| 2018/0035088 A1* | 2/2018 | Nose | ...................... | G06T 5/009 |
| 2019/0045089 A1* | 2/2019 | Tanner | ................... | G09G 5/399 |
| 2019/0279549 A1* | 9/2019 | Shin | ..................... | G09G 3/2007 |

FOREIGN PATENT DOCUMENTS

JP 2003-309763 A 10/2003

OTHER PUBLICATIONS

"JVCKENWOOD Exhibit at IFA Berlin 2019"; Aug. 28, 2019.

* cited by examiner

*Primary Examiner* — Aaron M Richer
(74) *Attorney, Agent, or Firm* — Nath, Goldberg & Meyer; Jerald L. Meyer

(57) ABSTRACT

If a scene change is not detected by a scene change detector, in each frame until a count value of a frame counter reaches a predetermined value, a tone curve pattern updater sets a representative point group of a tone curve pattern selected in the most recent frame in which a count value is reset to an initial value as a representative point group for updating. By assuming that k is a number less than 1, the tone curve pattern updater generates a first multiplication value obtained by multiplying the set representative point group for updating by a coefficient (1−k) and a second multiplication value obtained by multiplying the representative point group output by the tone curve pattern updater in an immediately preceding frame of each frame by a coefficient k, and outputs a combined representative point group obtained by adding the first multiplication value and the second multiplication value.

5 Claims, 9 Drawing Sheets

FIG. 4

| PERCENTILE | CLASS |
|---|---|
| 25% | 17 |
| 50% | 28 |
| 75% | 46 |
| 90% | 62 |
| 95% | 63 |
| 99% | 64 |

FIG. 5A

| PERCENTILE 99% | PERCENTILE 90% | TONE CURVE PATTERN |
|---|---|---|
| 64 | 64 | 0 |
| 64 | 63 | 1 |
| 64 | 62 | 2 |
| ⋮ | ⋮ | ⋮ |

FIG. 5B

| PERCENTILE 99% | TONE CURVE PATTERN |
|---|---|
| 64 | 0 |
| 63 | 1 |
| 62 | 2 |
| ⋮ | ⋮ |

FIG. 13

| FRAME NUMBER | 0 | 1 | 2 | 3 | 4 | 5 | 6 | 7 | 8 |
|---|---|---|---|---|---|---|---|---|---|
| TONE CURVE PATTERN SELECTED IN CURRENT FRAME | #0 | #1 | #2 | #3 | #4 | #5 | #6 | #7 | #8 |
| WHETHER SCENE CHANGE HAS BEEN DETECTED | 0 | 0 | 0 | 1 | 0 | 0 | 0 | 0 | 0 |
| COUNT VALUE OF FRAME COUNTER | 1 | 2 | 3 | 1 | 2 | 3 | 4 | 1 | 2 |
| REPRESENTATIVE POINT GROUP FOR UPDATING | #0 | #0 | #0 | #3 | #3 | #3 | #3 | #7 | #7 |
| IMMEDIATELY PRECEDING FRAME | −1 | 0 | 1 | REPRESENTATIVE POINT GROUP OF #3 | 3 | 4 | 5 | 6 | 7 |
| OUTPUT OF TONE CURVE PATTERN UPDATER | 0.25 × (REPRESENTATIVE POINT GROUP OF #0) + 0.75 × (OUTPUT RESULT IN FRAME NUMBER −1) | 0.25 × (REPRESENTATIVE POINT GROUP OF #0) + 0.75 × (OUTPUT RESULT IN FRAME NUMBER 0) | 0.25 × (REPRESENTATIVE POINT GROUP OF #0) + 0.75 × (OUTPUT RESULT IN FRAME NUMBER 1) | | 0.25 × (REPRESENTATIVE POINT GROUP OF #3) + 0.75 × (OUTPUT RESULT IN FRAME NUMBER 3) | 0.25 × (REPRESENTATIVE POINT GROUP OF #3) + 0.75 × (OUTPUT RESULT IN FRAME NUMBER 4) | 0.25 × (REPRESENTATIVE POINT GROUP OF #3) + 0.75 × (OUTPUT RESULT IN FRAME NUMBER 5) | 0.25 × (REPRESENTATIVE POINT GROUP OF #7) + 0.75 × (OUTPUT RESULT IN FRAME NUMBER 6) | 0.25 × (REPRESENTATIVE POINT GROUP OF #7) + 0.75 × (OUTPUT RESULT IN FRAME NUMBER 7) |

VIDEO SIGNAL PROCESSING DEVICE AND VIDEO SIGNAL PROCESSING METHOD

CROSS REFERENCE TO RELATED APPLICATION

This application is based upon and claims the benefit of priority under 35U.S.C. § 119 from Japanese Patent Application No. 2019-229142 filed on Dec. 19, 2019, the entire contents of which are incorporated herein by reference.

BACKGROUND

The present disclosure relates to a video signal processing device and a video signal processing method.

Japanese Unexamined Patent Application Publication No. 2003-309763 discloses the detection of a scene change and the change of a tone curve pattern that represents gradations for each scene change.

SUMMARY

An image may not be displayed with appropriate luminance in accordance with an image content of a video signal sometimes only with the change of a tone curve pattern for each scene change.

A first aspect of one or more embodiments provides a video signal processing device including: a gradation analyzer configured to analyze a distribution of a gradation of an image of each frame of an input video signal in a range from a low gradation side to a high gradation side; a tone curve pattern selector configured to select any one of a plurality of tone curve patterns that determine a relationship between the gradation of the video signal and luminance of the image in accordance with the distribution of the gradation of the image analyzed by the gradation analyzer; a scene change detector configured to detect whether a scene change of the video signal has occurred; a tone curve pattern updater including a frame counter configured to count from an initial value to a predetermined value correspondingly with a progression of the frame of the video signal, and if a count value reaches the predetermined value, is configured to reset the count value to the initial value, and in a case where the scene change is detected by the scene change detector, even if the count value has not reached the predetermined value, is configured to reset the count value to the initial value; and is configured to generate and output the updated representative point group of the tone curve pattern; and a spline interpolator configured to perform a spline interpolation on the representative point group output from the tone curve pattern updater and is configured to generate the tone curve pattern subjected to the spline interpolation.

In the above described video signal processing device, if the scene change is not detected by the scene change detector, in each frame until the count value of the frame counter reaches the predetermined value, the tone curve pattern updater sets the representative point group of the tone curve pattern selected in the most recent frame in which the count value is reset to the initial value as a representative point group for updating, by assuming that k is a predetermined positive coefficient of less than 1, generates a first multiplication value obtained by multiplying the set representative point group for updating by a coefficient (1−k) and a second multiplication value obtained by multiplying the representative point group output from the tone curve pattern updater in an immediately preceding frame of each of the frames by a coefficient k, and outputs a combined representative point group obtained by adding the first multiplication value and the second multiplication value as the updated representative point group.

In the above described video signal processing device, if the scene change is not detected by the scene change detector, in a next frame in which the count value is reset to the initial value of a frame in which the count value of the frame counter reaches the predetermined value, the tone curve pattern updater sets the representative point group of the tone curve pattern selected in a current frame in which the count value is reset to the initial value as the representative point group for updating, generates the first multiplication value obtained by multiplying the set representative point group for updating by the coefficient (1−k) and the second multiplication value obtained by multiplying the representative point group output from the tone curve pattern updater in an immediately preceding frame of the current frame by the coefficient k, and outputs the combined representative point group obtained by adding the first multiplication value and the second multiplication value as the updated representative point group.

In the above described video signal processing device, if the scene change is detected by the scene change detector, in the frame in which the count value of the frame counter is reset to the initial value, the tone curve pattern updater outputs the representative point group of the tone curve pattern selected in the current frame in which the count value is reset to the initial value as the updated representative point group.

A second aspect of one or more embodiments provides a video signal processing method including: analyzing a distribution of a gradation of an image of each frame of an input video signal in a range from a low gradation side to a high gradation side; selecting any one of a plurality of tone curve patterns that determine a relationship between the gradation of the video signal and luminance of the image in accordance with the analyzed distribution of the gradation of the image; detecting whether a scene change of the video signal has occurred; counting from an initial value to a predetermined value correspondingly with a progression of the frame of the video signal by a frame counter, if a count value reaches the predetermined value, resetting the count value to the initial value, and in a case where the scene change is detected, even if the count value has not reached the predetermined value, resetting the count value to the initial value; generating and outputting the updated representative point group of the tone curve pattern in each frame; performing a spline interpolation on the output representative point group and generating the tone curve pattern subjected to the spline interpolation, if the scene change is not detected, in each frame until the count value of the frame counter reaches the predetermined value, setting the representative point group of the tone curve pattern selected in the most recent frame in which the count value is reset to the initial value as a representative point group for updating, by assuming that k is a predetermined positive coefficient of less than 1, generating a first multiplication value obtained by multiplying the set representative point group for updating by a coefficient (1−k) and a second multiplication value obtained by multiplying the representative point group output in an immediately preceding frame of each of the frames by a coefficient k, and outputting a combined representative point group obtained by adding the first multiplication value and the second multiplication value as the updated representative point group; if the scene change is not detected, in a next frame in which the count value is reset to the initial value of a frame in which the count value of the frame counter reaches the predetermined value, setting the representative point group of the tone curve pattern selected in a current frame in which the count value is reset to the initial value as the representative point group for updating, generating the first multiplication value obtained by multiplying the set representative point group for updating by the coefficient (1−k) and the second multiplication value obtained by multiplying the representative point group output in an immediately preceding frame of the current frame by the coefficient k, and outputting the combined representative point group obtained by adding the first multiplication value and the second multiplication value as the updated representative point group; and if the scene change is detected, in the frame in which the count value of the frame counter is reset to the initial value, outputting the representative point group of the tone curve pattern selected in the current frame in which the count value is reset to the initial value as the updated representative point group.

BRIEF DESCRIPTION OF THE DRAWINGS

FIG. 4 is a diagram illustrating a class corresponding to a percentile of a cumulative histogram obtained by a percentile information converter of the video signal processing device according to one or more embodiments.

FIG. 5A is a diagram illustrating a first example in which a tone curve pattern selector of the video signal processing device according to one or more embodiments selects a tone curve pattern based on a class of a percentile.

FIG. 5B is a diagram illustrating a second example in which a tone curve pattern selector of the video signal processing device according to one or more embodiments selects a tone curve pattern based on a class of a percentile.

FIG. 13 is a table illustrating an example in which a representative point group of a tone curve pattern is updated by the video signal processing device and a video signal processing method according to one or more embodiments.

DETAILED DESCRIPTION

Figure 1:
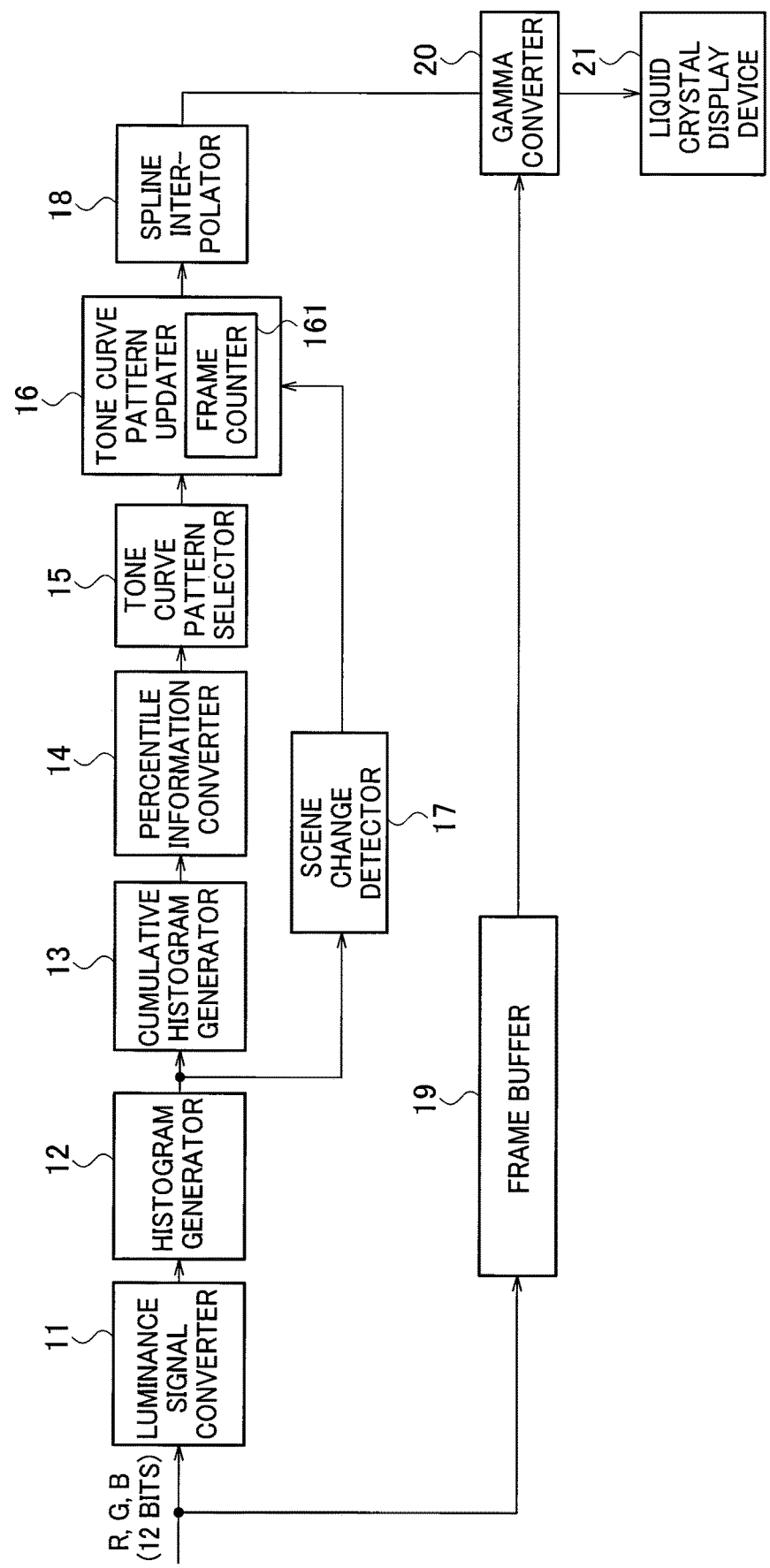
FIG. 1 is a block diagram illustrating a video signal processing device according to one or more embodiments.

A video signal processing device and a video signal processing method according to one or more embodiments are described below with reference to the accompanying drawings. In FIG. 1, a three-primary color signal of R, G, and B having 12 bits that is an example of an input video signal is input to a luminance signal converter 11 and a frame buffer 19. The luminance signal converter 11 converts the RGB signal into a luminance signal and supplies the converted signal to a histogram generator 12. The frame buffer 19 holds the received RGB signal.

If the input video signal is the luminance signal and color-difference signals, it is not necessary to provide the luminance signal converter 11, and the luminance signal may be supplied to the histogram generator 12.

The histogram generator 12, in each frame, divides 4096 gradations of a luminance signal into 64 classes, for example, each class having 64 gradations, and obtains a frequency of luminance of each class to generate a luminance histogram. The number of classes and the number of gradations in each class are arbitrary. The luminance histogram is supplied to a cumulative histogram generator 13 and a scene change detector 17.

Figure 2:
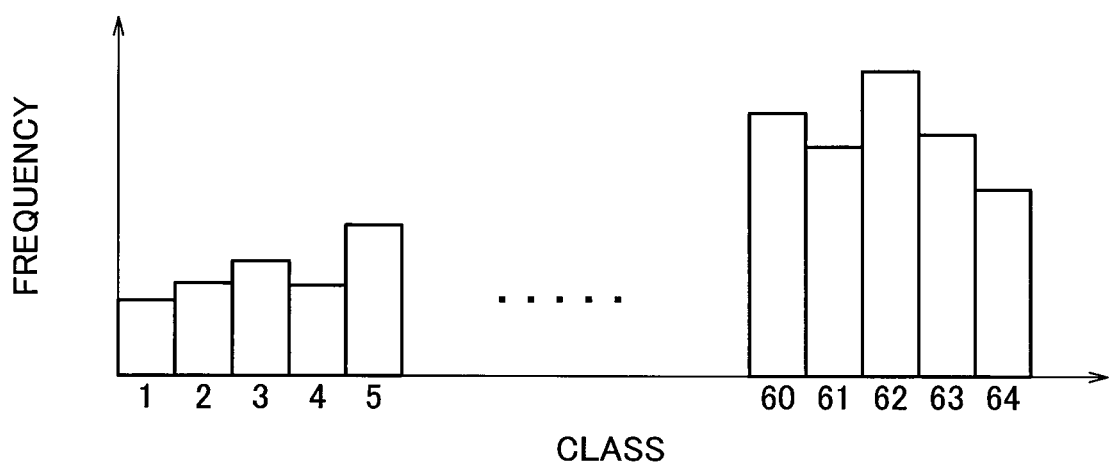
FIG. 2 is a diagram illustrating an example of a luminance histogram generated by a histogram generator of the video signal processing device according to one or more embodiments.
Figure 3:
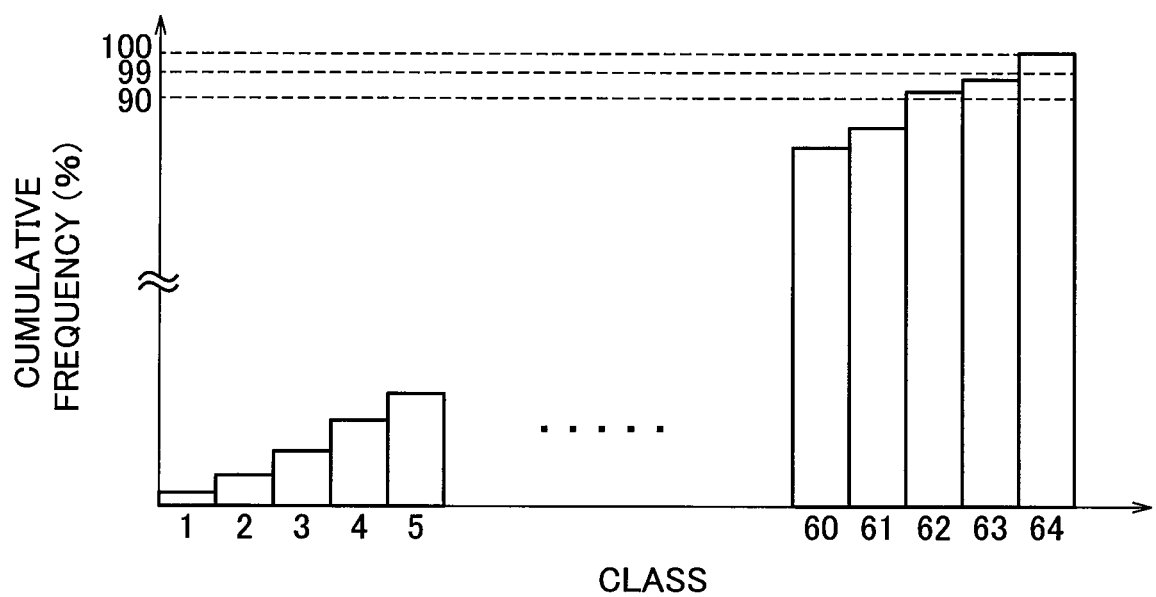
FIG. 3 is a diagram illustrating an example of a cumulative histogram generated by a cumulative histogram generator of the video signal processing device according to one or more embodiments.

FIG. 2 illustrates an example of a luminance histogram. The cumulative histogram generator 13 generates a cumulative histogram in which a frequency of each class and frequencies of classes lower than each class are cumulated in a manner of generating a frequency obtained by adding frequencies of class 1 and class 2 in class 2 in the luminance histogram, generating a frequency obtained by adding frequencies of class 1 to class 3 in class 3, and generating a frequency obtained by adding frequencies of class 1 to class 4 in class 4. FIG. 3 illustrates an example of a cumulative histogram. The cumulative histogram is supplied to a percentile information converter 14.

As illustrated in FIG. 4, the percentile information converter 14, as an example, obtains classes corresponding to percentiles 25%, 50%, 75%, 90%, 95%, and 99%. As illustrated in FIG. 3, a cumulative frequency of the highest class 64 is assumed to be 100%. A class of a percentile 99% is a class in which the cumulative frequency is 99% and a class of a percentile 90% is a class in which the cumulative frequency is 90%. In an example illustrated in FIG. 3, a class of a percentile 99% is 64 and a class of a percentile 90% is 62.

In an example illustrated in FIG. 4, classes of percentiles 25%, 50%, 75%, 90%, 95%, and 99% are respectively 17, 28, 46, 62, 63, and 64. The percentile information converter 14 does not need to obtain classes of all of percentiles 25%, 50%, 75%, 90%, 95%, and 99%, and alternatively may obtain classes of only selected percentiles such as only percentiles 90% and 99%, or only a percentile 99%.

The tone curve pattern selector 15 selects the tone curve pattern based on a class of a predetermined percentile obtained from the percentile information converter 14. FIG. 5A illustrates an example of selecting the tone curve pattern based on a combination of a class of a percentile 99% and a class of a percentile 90%. FIG. 5B illustrates an example of selecting the tone curve pattern based on a class of a percentile 99%.

Figure 6:
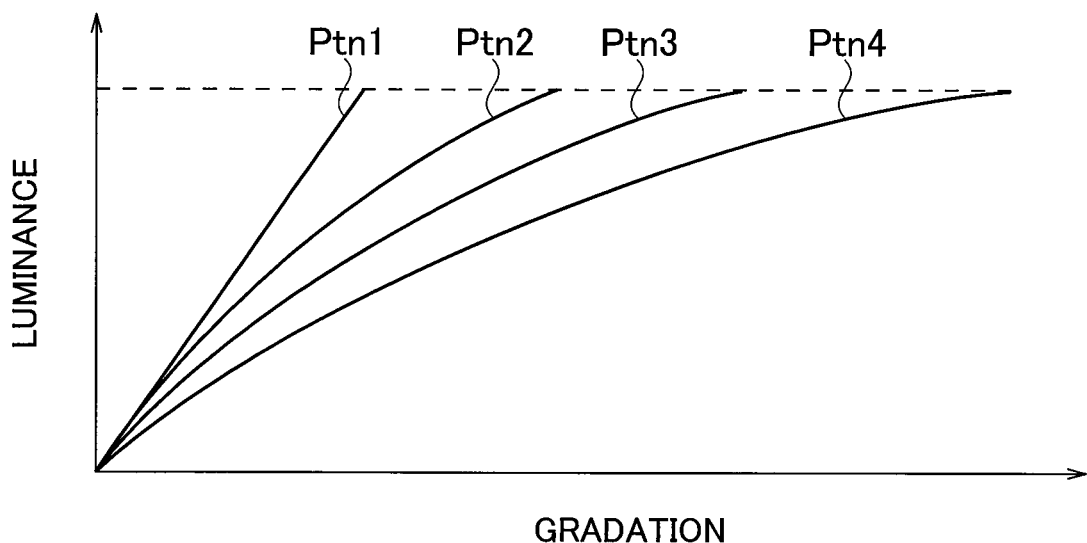
FIG. 6 is a characteristic diagram illustrating an example of a tone curve pattern selected by a tone curve pattern selector.

As illustrated in FIG. 6, the tone curve pattern is a pattern of a gradation curve indicating by what characteristics, gradations and luminance of an image are represented. A relationship between gradations of a video signal and luminance of a displayed image is determine by the tone curve pattern.

FIG. 6 illustrates four selected patterns Ptn1 to Ptn4 from among a plurality of tone curve patterns. The 0, 1, 2 . . . of the tone curve patterns illustrated in FIG. 5A or FIG. 5B are either patterns Ptn1 to Ptn4 or unillustrated other patterns.

Figure 7:
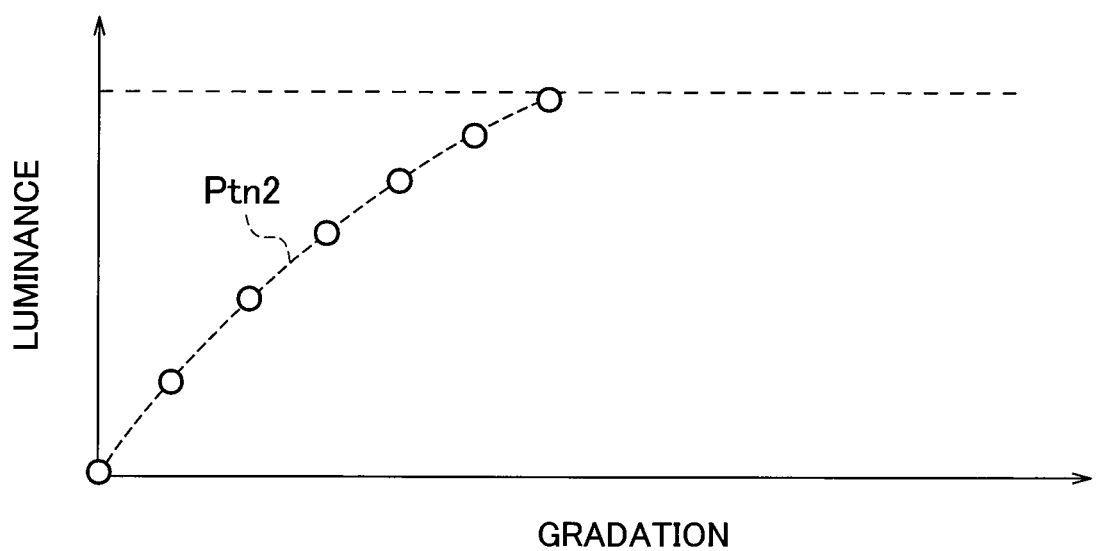
FIG. 7 is a characteristic diagram illustrating a plurality of discrete points forming a tone curve pattern.

Specifically, the tone curve pattern is configured from a plurality of discrete points indicated by white circles that form the pattern of the gradation curve illustrated in FIG. 7. FIG. 7 illustrates discrete points that form the pattern Ptn2 of the four patterns illustrated in FIG. 6. The formation of the tone curve pattern with the plurality of discrete points can reduce the capacitance of the tone curve pattern held by the tone curve pattern selector 15.

The histogram generator 12 to the percentile information converter 14 detect whether an image of each frame of the input video signal is, as an overall trend, a bright image having high gradations or alternatively whether the image of each frame of the input video signal is a dark image centered on low gradations. A peak luminance detector that detects peak luminance within each frame may be provided instead of providing the histogram generator 12 to the percentile information converter 14. A tone curve pattern selector 15 may select the tone curve pattern based on the peak luminance in each frame.

The video signal processing device may include a gradation analyzer that analyzes how gradations of an image of each frame of the input video signal are distributed in a range from a low gradation side to a high gradation side. The histogram generator 12 to the percentile information converter 14 are an example of the gradation analyzer and the peak luminance detector is another example of the gradation analyzer. The peak luminance detector is not able to analyze in a strict sense how gradations are distributed in the range from the low gradation side to the high gradation side. However, if the peak luminance is positioned on the high gradation side, it is possible to assume that gradations are roughly distributed in the range from the low gradation side to the high gradation side, and alternatively, if the peak luminance is positioned on the low gradation side, it is possible to assume that the gradations are concentrated on the low gradation side.

If the distribution of the gradations is analyzed based on the luminance histogram generated by the histogram generator 12 as in one or more embodiments, the distribution of the gradations can be analyzed with high precision. Accordingly, the gradation analyzer preferably includes the histogram generator 12.

Figure 8:
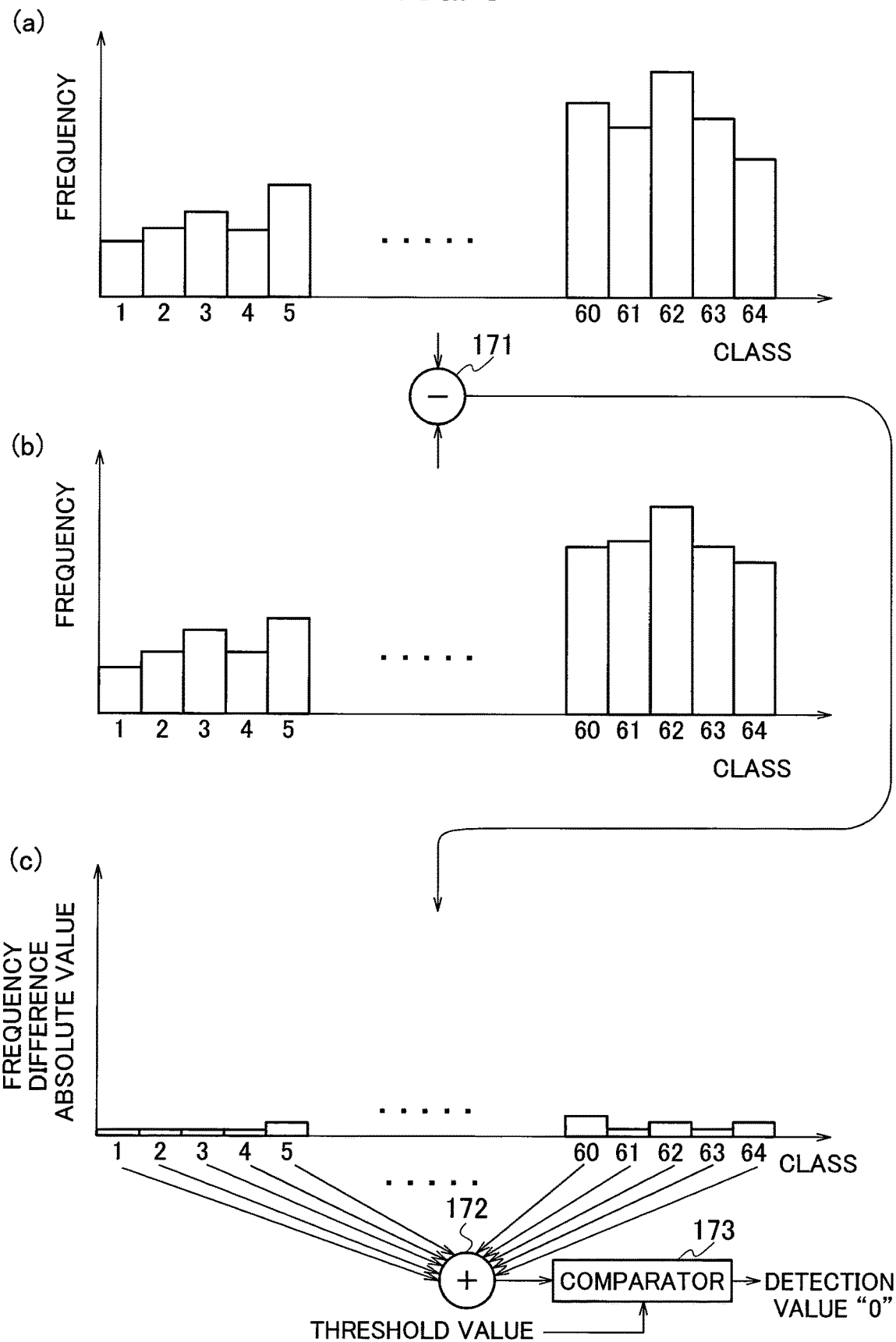
FIG. 8 is a diagram illustrating an example in which a scene change detector of the video signal processing device according to one or more embodiments detects that a scene change has not been detected.
Figure 9:
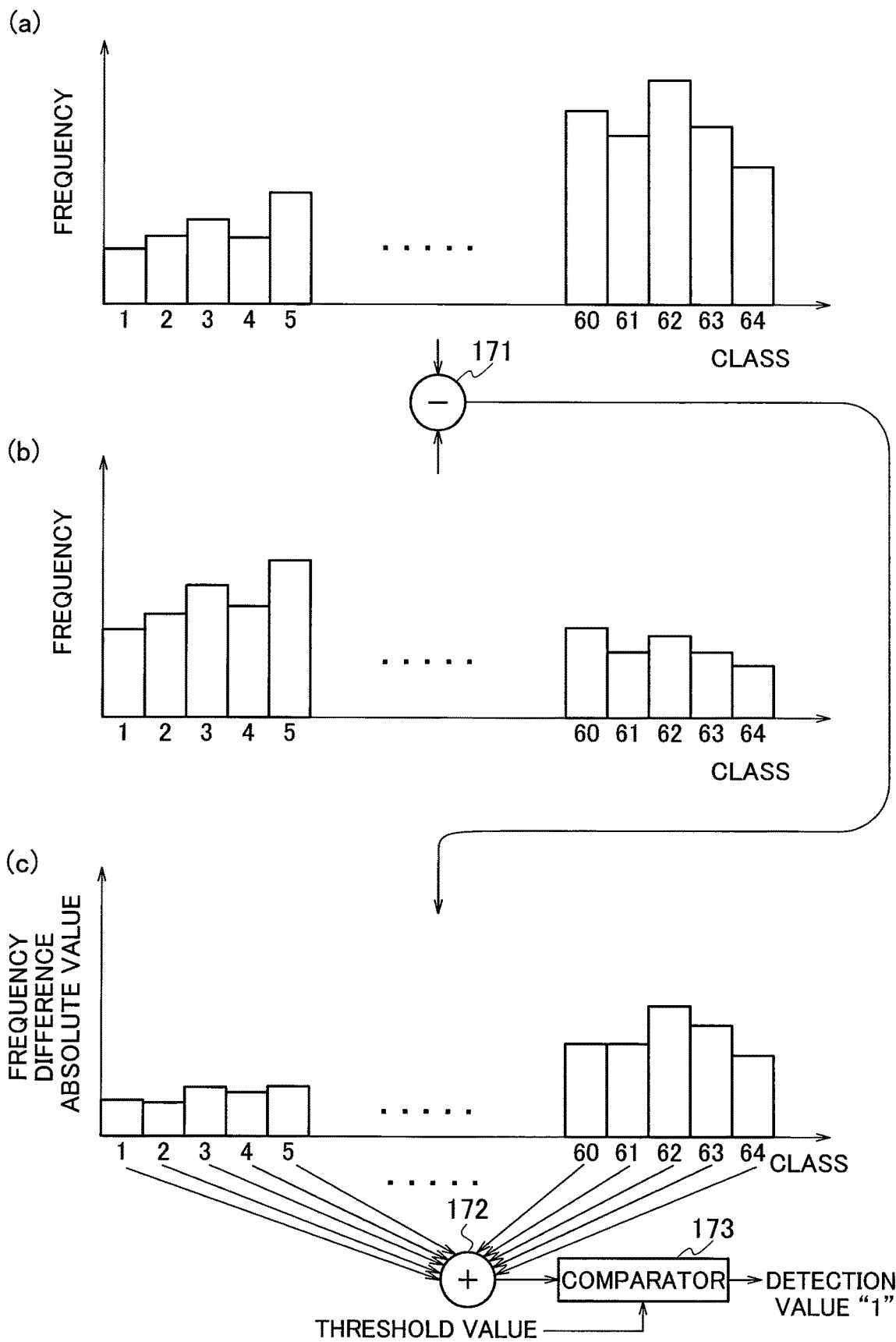
FIG. 9 is a diagram illustrating an example in which a scene change detector of the video signal processing device according to one or more embodiments detects that a scene change has been detected.

With reference to FIG. 8 and FIG. 9, how the scene change detector 17 detects a scene change is described. (b) of FIG. 8 and FIG. 9 illustrate a luminance histogram generated by the histogram generator 12 in a current frame and (a) of FIG. 8 and FIG. 9 illustrate a luminance histogram generated by the histogram generator 12 in an immediately preceding frame. FIG. 8 illustrates a case where a scene change occurs in the current frame and alternatively, FIG. 9 illustrates a case where a scene change does not occur in the current frame.

A subtractor 171 of the scene change detector 17 obtains an absolute value of a difference value for each class of the luminance histogram of the current frame and the luminance histogram of the immediately preceding frame. (c) of FIG. 8 and FIG. 9 illustrates a frequency difference absolute value of each class. An adder 172 of the scene change detector 17 adds frequency difference absolute values of all classes. A comparator 173 of the scene change detector compares the sum of the frequency difference absolute values of all classes with a predetermined threshold value, and if the sum is equal to or less than the threshold value, determines that the scene change does not occur, and alternatively, if the sum exceeds the threshold value, determines that the scene change has occurred.

As illustrated in FIG. 8, if the scene change detector 17 determines that the scene change does not occur, the comparator 173 outputs "0" as a detection value of the scene change. Alternatively, as illustrated in FIG. 9, if the scene change detector 17 determines that the scene change has occurred, the comparator 173 outputs "1" as the detection value of the scene change. The detection value generated by the scene change detector 17 is supplied to a tone curve pattern updater 16.

The method of the scene change detector 17 for detecting whether the scene change has occurred is not limited to the method based on the luminance histogram. If the video signal processing device is configured to include the histogram generator 12 as the gradation analyzer, it is preferable that the scene change detector 17 detects whether the scene change has occurred based on the luminance histogram.

Figure 10:
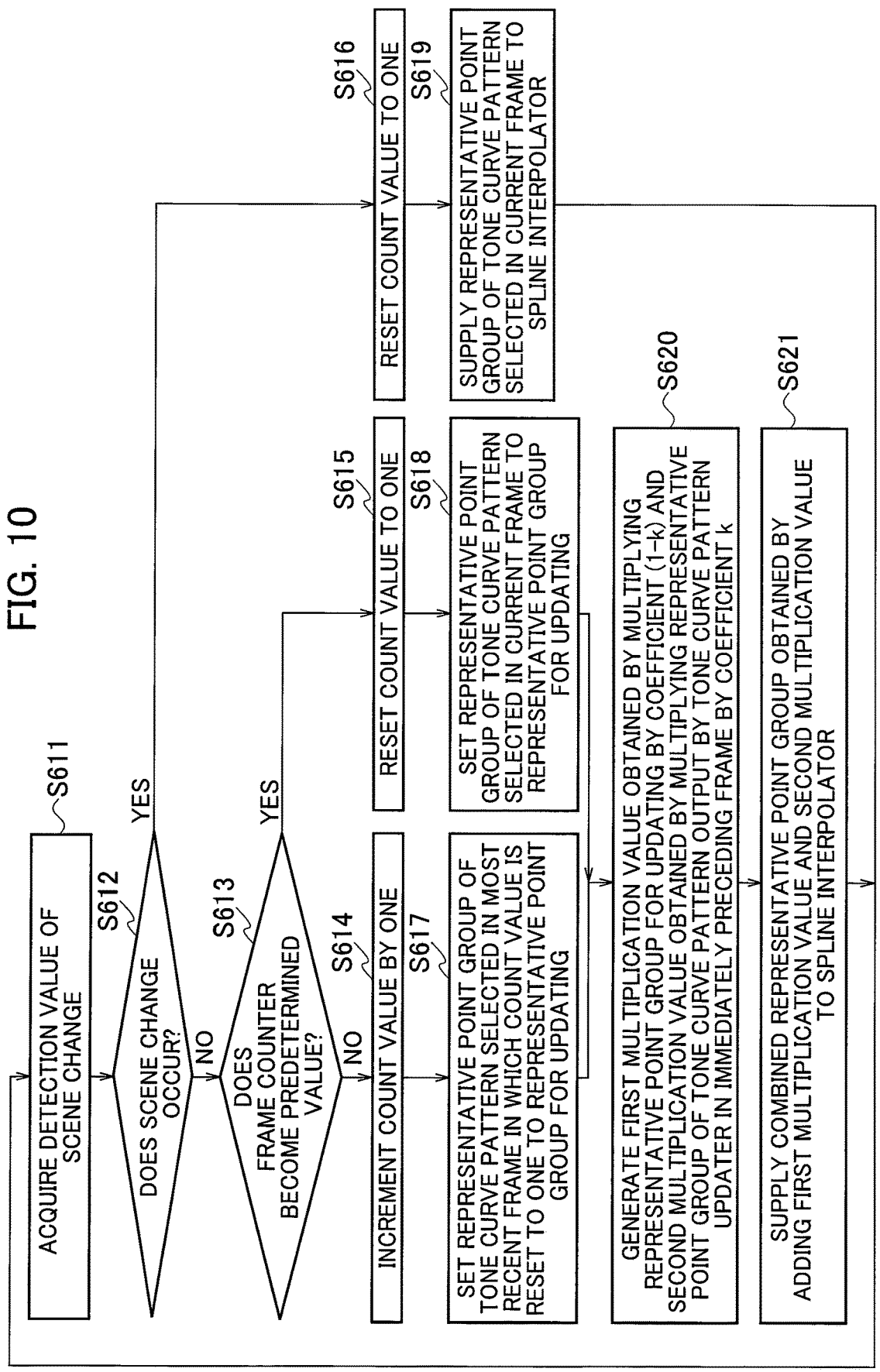
FIG. 10 is a flowchart illustrating processes performed by a tone curve pattern updater of the video signal processing device according to one or more embodiments that is a video signal processing method according to one or more embodiments.

The tone curve pattern updater 16 updates the tone curve pattern by processes illustrated in a flowchart of FIG. 10. In FIG. 10, the tone curve pattern updater 16 acquires the detection value of the scene change in step S611. In step S612, if the scene change does not occur (NO) (that is, if the detection value is "0"), the tone curve pattern updater 16 advances a process to step S613. Alternatively, in step S612, if the scene change has occurred (YES) (that is, if the detection value is "1"), the tone curve pattern updater 16 advances a process to step S616.

As illustrated in FIG. 1, the tone curve pattern updater 16 includes the frame counter 161. The frame counter 161 receives unillustrated frame synchronization pulses, counts from the initial value to the predetermined value correspondingly with the progression of the frame, and resets a count value to the initial value on a condition which will be described later. Here, the initial value is assumed to be one.

Returning to FIG. 10, in step S613, the tone curve pattern updater 16 determines whether the count value of the frame counter 161 is the predetermined value. The predetermined value may be set to an appropriate value, such as 10, for example. If the count value of the frame counter 161 is not the predetermined value (NO), in step S614, the tone curve pattern updater 16 increments the count value by one and advances a process to step S617.

First, described is how the tone curve pattern updater 16 updates the tone curve pattern in a case where the scene change does not occur and the count value of the frame counter 161 does not take the predetermined value.

The tone curve pattern updater 16, in step S617, sets a representative point group of the tone curve pattern selected in the most recent frame in which the count value is reset to one to a representative point group for updating. The frame in which the count value is reset to one is the frame in which the scene change is detected or a next frame of the frame in which the count value reaches the predetermined value.

The tone curve pattern updater 16, in step S620, generates a first multiplication value obtained by multiplying the representative point group for updating by a coefficient $(1-k)$ and a second multiplication value obtained by multiplying the representative point group of the tone curve pattern output by the tone curve pattern updater 16 in the immediately preceding frame by a coefficient k. The k is a positive number less than one.

The tone curve pattern updater 16, in step S621, supplies, to a spline interpolator 18, a combined representative point group obtained by adding the first multiplication value and the second multiplication value, as an updated representative point group, and in the next frame, returns a process to step S611.

Figure 11:
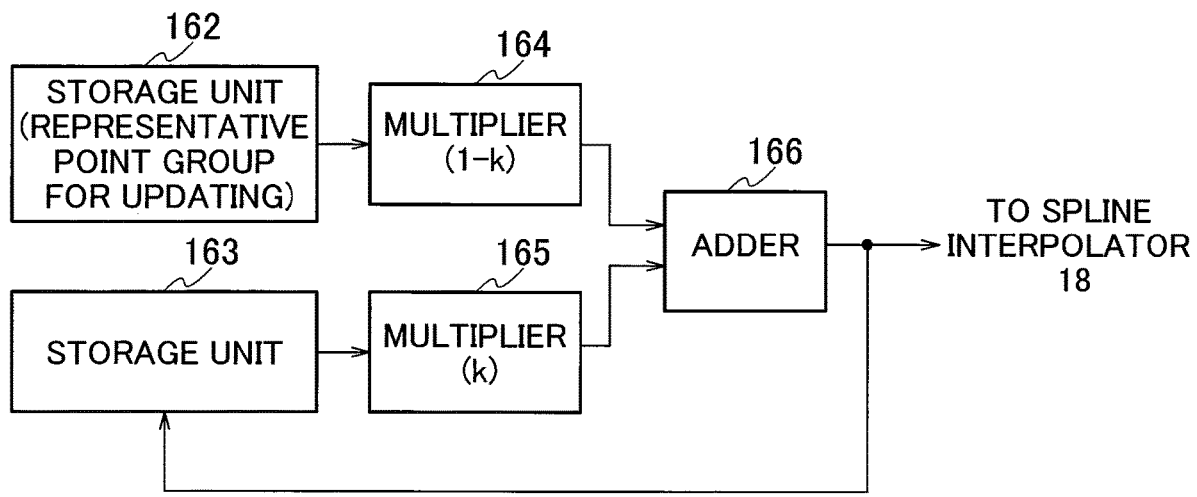
FIG. 11 is a block diagram illustrating a partial constitution of a tone curve pattern updater.

The tone curve pattern updater 16 has a constitution of performing feedback processes illustrated in FIG. 11. The tone curve pattern updater 16 includes a storage unit 162 that stores the representative point group for updating and a storage unit 163 that stores the representative point group of the tone curve pattern that is output by the tone curve pattern updater 16 and is supplied to the spline interpolator 18, multipliers 164 and 165, and an adder 166. By constitutions illustrated in FIG. 11, processes of steps S617, S620 and S621 are performed.

A value of the coefficient k preferably exceeds 0.5. Here, the coefficient k is assumed to be 0.75, for example. If a value of the coefficient k is set to be a number exceeding 0.5, the ratio of the representative point group that is generated in the immediately preceding frame and is output by the tone curve pattern updater 16 becomes larger than the ratio of the representative point group for updating, and thus, the representative point group of the tone curve pattern gradually changes to reduce visual discomfort.

In this manner, if the scene change does not occur, the tone curve pattern updater 16 repeats processes of steps S617, S620, and S621 in each frame until the count value of the frame counter 161 reaches the predetermined value.

Described next is how the tone curve pattern updater 16 updates the tone curve pattern in a case where the scene change does not occur and the count value of the frame counter 161 is the predetermined value. In step S613, if the count value is the predetermined value (YES), in step S615, the tone curve pattern updater 16 resets the count value to one and causes a process to be advanced to step S618.

In step S618, the tone curve pattern updater 16 sets the representative point group of the tone curve pattern selected in the current frame to the representative point group for updating. In step S620, the tone curve pattern updater 16 generates the first multiplication value obtained by multiplying the representative point group for updating by the coefficient (1−k) and the second multiplication value obtained by multiplying the representative point group of the tone curve pattern output by the tone curve pattern updater 16 in the immediately preceding frame by the coefficient k.

In step S621, the tone curve pattern updater 16 supplies the combined representative point group obtained by adding the first multiplication value and the second multiplication value to the spline interpolator 18 as the updated representative point group and returns a process to step S611 in the next frame.

If a process is advanced from step S618 to step S620, the storage unit 162 stores the representative point group of the tone curve pattern selected in the current frame as the representative point group for updating. By a constitution illustrated in FIG. 11, processes of steps S618, S620, and S621 are performed.

In this manner, if the scene change does not occur, the tone curve pattern updater 16 resets the count value to one in the next frame of the frame in which the count value of the frame counter 161 reaches the predetermined value. The tone curve pattern updater 16 sets the representative point group of the tone curve pattern selected in the current frame in which the count value is reset as the representative point group for updating and performs processes of steps S620 and S621.

Described further is how the tone curve pattern updater 16 updates the tone curve pattern if the scene change has occurred. In step S616, the tone curve pattern updater 16 resets the count value to one and causes a process to be advanced to step S619.

In step S619, the tone curve pattern updater 16 supplies, to the spline interpolator 18, the representative point group of the tone curve pattern selected in the current frame in which the count value is reset without change and in the next frame, returns a process to step S611. If the scene change has occurred, the representative point group of the tone curve pattern is immediately changed to a new representative point group because it is not affected by the representative point group of the tone curve pattern selected in a past frame.

Returning to FIG. 1, the spline interpolator 18 performs the spline interpolation on the representative point group of the tone curve pattern supplied from the tone curve pattern updater 16 and increases the number of points configuring the tone curve pattern.

Figure 12:
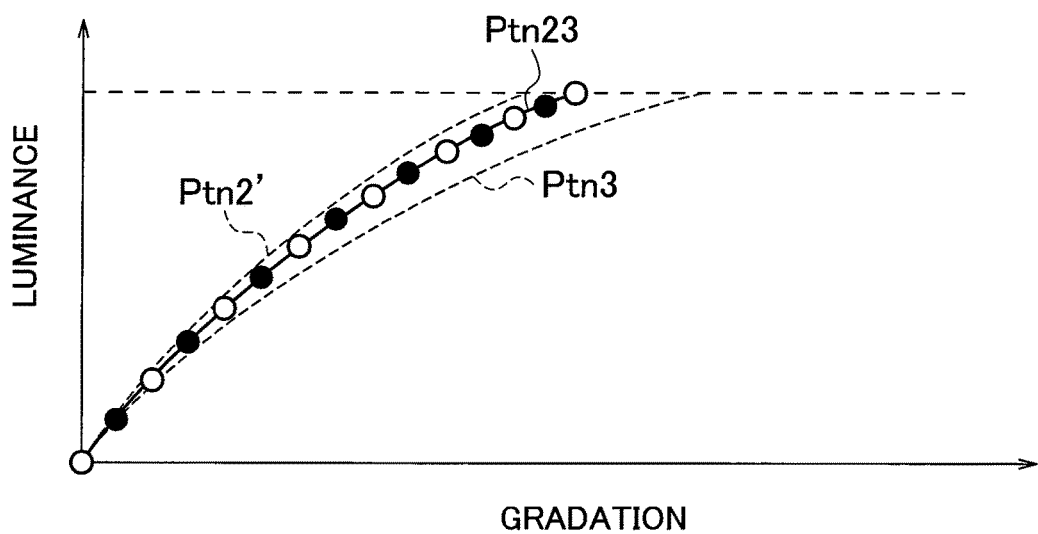
FIG. 12 is a characteristic diagram schematically illustrating processes performed by a tone curve pattern updater and a spline interpolator of the video signal processing device according to one or more embodiments.

Here, a case where the tone curve pattern updater 16 performs processes of processes of steps S620 and S621 in FIG. 10 and the spline interpolator 18 performs the spline interpolation on the representative point group of the tone curve pattern is taken as an example. In FIG. 12, a pattern Ptn2' is the tone curve pattern output by the tone curve pattern updater 16 in the immediately preceding frame and a pattern Ptn3 is a tone curve pattern for updating. In the patterns Ptn2' and Ptn3, the illustration of the representative point group is omitted.

Conceptually, the representative point group indicated by white circles of the pattern Ptn23 obtained by combining the pattern Ptn2' and the pattern Ptn3 is generated by processes of steps S620 and S621. The spline interpolator 18 generates interpolating points indicated by black circles by performing the spline interpolation and increases the number of points configuring the pattern Ptn23. For the simplification, FIG. 12 illustrates only a single interpolating point between the two adjacent representative points. In an actual case, the larger number of interpolating points is generated.

With reference to a table illustrated in FIG. 13, an example in which the representative point group of the tone curve pattern is updated is described. In FIG. 13, for the simplification, the predetermined value of the count value of the frame counter 161 is set to four. A frame number of the frame is incremented by one in an ascending order such as 0, 1, 2, and so on The tone curve patterns selected in the current frame are defined as #0, #1, #2, and so on. The tone curve patterns #0, #1, #2, and so on do not indicate patterns Ptn1 to Ptn4 or other specific patterns. For example, the tone curve pattern #0 means a tone curve pattern selected in a frame denoted with a frame number 0 and the tone curve pattern #1 means a tone curve pattern selected in a frame denoted with a frame number 1.

As has been described above, if the scene change does not occur, the detection value of the scene change is "0", and alternatively, if the scene change has occurred, the detection value of the scene change is "1." Accordingly, "0" in the row on whether a scene change has been detected indicates that a scene change has not been detected and alternatively, "1" in the row indicates that a scene change has been detected. The count value of the frame counter 161 is incremented by one from 1 to 4, and after reaching 4, the value is reset to 1, but in a case where a scene change has been detected, even if the count value does not reach 4, the value is reset to 1.

In an example of FIG. 13, the scene change occurs in the frame denoted with the frame number 3 and the count value of the frame counter 161 is reset to 1. In each of the frames denoted with the frame numbers 0 to 2, processes of steps S614, S617, S620, and S621 in FIG. 10 are performed. Specifically, the tone curve pattern updater 16 sets the representative point group of the tone curve pattern #0 selected in the frame denoted with the frame number 0 in which the count value is reset to one as the representative point group for updating.

The tone curve pattern updater 16 updates the representative point group in the frame denoted with the frame number 0 based on a math formula of 0.25×(the representative point group of the tone curve pattern #0)+0.75×(an output result in a frame whose frame number is decremented by one from the frame number of the current frame). The tone curve pattern updater 16 updates the representative point group in the frame denoted with the frame number 1 based on a math formula of 0.25×(the representative point group of the tone curve pattern #0)+0.75×(an output result in the frame denoted with the frame number 0).

Further, the tone curve pattern updater 16 updates the representative point group in the frame denoted with the frame number 2 based on a math formula of 0.25×(the representative point group of the tone curve pattern #0)+0.75×(an output result in the frame denoted with the frame number 1).

The scene change occurs in the frame denoted with the frame number 3, and thus, processes of steps S616 and S619 in FIG. 10 are performed. Specifically, the tone curve pattern updater 16 outputs the representative point group of the tone curve pattern #3 selected in the frame denoted with the frame number 3 in which the count value is reset to one without change.

In each of frames denoted with the frame numbers 4 to 6, processes of steps S614, S617, S620, and S621 in FIG. 10 are performed. The tone curve pattern updater 16 sets the representative point group of the tone curve pattern #3 selected in the frame denoted with the frame number 3 in which the count value is reset to one as the representative point group for updating.

The tone curve pattern updater 16 updates the representative point group in the frame denoted with the frame number 4 based on a math formula of 0.25×(the representative point group of the tone curve pattern #3)+0.75×(the output result in the frame denoted with the frame number 3). The tone curve pattern updater 16 updates the representative point group in the frame denoted with the frame number 5 based on a math formula of 0.25×(the representative point group of the tone curve pattern #3)+0.75×(the output result in the frame denoted with the frame number 4).

The tone curve pattern updater 16 updates the representative point group in the frame denoted with the frame number 6 based on a math formula of 0.25×(the representative point group of the tone curve pattern #3)+0.75×(the output result in the frame denoted with the frame number 5).

In the frame denoted with the frame number 7, processes of steps S615, S618, S620, and S621 in FIG. 10 are performed. Specifically, the tone curve pattern updater 16 sets the representative point group of the tone curve pattern #7 selected in the current frame denoted with the frame number in which the count value is reset to one as the representative point group for updating. The tone curve pattern updater 16 updates the representative point group in the frame denoted with the frame number 7 based on a math formula of 0.25×(the representative point group of the tone curve pattern #7)+0.75×(the output result in the frame denoted with the frame number 6).

In the frame denoted with the frame number 8, processes of steps S614, S617, S620, and S621 in FIG. 10 are performed. The tone curve pattern updater 16 sets the representative point group of the tone curve pattern #7 selected in the frame denoted with the frame number 7 as the representative point group for updating. The tone curve pattern updater 16 updates the representative point group in the frame denoted with the frame number 8 based on a math formula of 0.25×(the representative point group of the tone curve pattern #7)+0.75×(the output result in the frame denoted with the frame number 7).

Returning to FIG. 1, a gamma converter 20 performs the gamma conversion on the RGB signal read from the frame buffer 19 based on the tone curve pattern output from the spline interpolator 18 and supplies the signal subjected to the gamma conversion to a liquid crystal display device 21. The RGB signal is read from the frame buffer 19 with a delay of the total time of each time required for each of the luminance signal converter 11 to the spline interpolator 18 to process the RGB signal. This enables each corresponding frame to be subjected to the gamma conversion based on the tone curve pattern generated from an analysis result of the distribution of the gradations of each frame.

The liquid crystal display device 21 is a transmissive liquid crystal display device or a reflective liquid crystal display device. An image based on the RGB signal modulated by the liquid crystal display device 21 is projected on a screen by an unillustrated projection lens.

In accordance with the video signal processing device and a video signal processing method according to one or more embodiments, not only a tone curve pattern is changed for each scene change, a representative point group of the tone curve pattern for updating is changed also in a unit of a predetermined frame included in a plurality of frames in which the scene change does not occur. Accordingly, in accordance with the video signal processing device and a video signal processing method according to one or more embodiments, an image can be displayed with appropriate luminance in accordance with an image content of a video signal.

In accordance with the video signal processing device and a video signal processing method according to one or more embodiments, the representative point group output from the tone curve pattern updater is reflected on the update of the tone curve pattern except for the frame in which the scene change is detected, and thus, the tone curve pattern can be smoothly changed. Accordingly, an observer of a projection image hardly feels a discomfort involved with the update of the tone curve pattern.

The present invention is not limited to one or more embodiments described above, and various modifications are possible within a scope not departing from a scope of the present invention. The video signal processing device is not limited to be constituted from hardware composed of an integrated circuit and the like, but may be constituted with a computer program (a video signal processing program) that causes a microcomputer to execute processes of FIG. 10. The video signal processing device may be constituted by an FPGA (Field Programmable Gate Array) or may be constituted from an ASIC (Application Specific Integrated Circuit).

What is claimed is:

1. A video signal processing device comprising:

a gradation analyzer configured to analyze a distribution of a gradation of an image of each frame of an input video signal in a range from a low gradation side to a high gradation side;

a tone curve pattern selector configured to select any one of a plurality of tone curve patterns that determine a relationship between a gradation of the video signal and luminance of the image in accordance with the distribution of the gradation of the image analyzed by the gradation analyzer;

a scene change detector configured to detect whether a scene change of the video signal has occurred;

a tone curve pattern updater comprising a frame counter configured to count from an initial value to a predetermined value correspondingly with a progression of the frame of the video signal, and if a count value reaches the predetermined value, the tone curve pattern updater is configured to reset the count value to the initial value, and in a case where the scene change is detected by the scene change detector, even if the count value has not reached the predetermined value, the tone curve pattern updater is configured to reset the count value to the initial value, and the tone curve pattern updater is configured to generate and output an updated representative point group of the tone curve pattern; and a spline interpolator configured to perform a spline interpolation on the representative point group output from the tone curve pattern updater and configured to generate a tone curve pattern subjected to the spline interpolation, wherein the tone curve pattern updater:

if the scene change is not detected by the scene change detector, in each frame until the count value of the frame counter reaches the predetermined value, sets the representative point group of the tone curve pattern selected in the most recent frame in which the count value is reset to the initial value as a representative point group for updating, by assuming that k is a predetermined positive coefficient of less than 1, generates a first multiplication value obtained by multiplying the set representative point group for updating by a coefficient (1−k) and a second multiplication value obtained by multiplying the representative point group output from the tone curve pattern updater in an immediately preceding frame relative to a current frame by a coefficient k, and outputs a combined representative point group obtained by adding the first multiplication value and the second multiplication value as the updated representative point group;

if the scene change is not detected by the scene change detector, in a next frame in which the count value is reset to the initial value of a frame in which the count value of the frame counter reaches the predetermined value, sets the representative point group of the tone curve pattern selected in the current frame in which the count value is reset to the initial value as a representative point group for updating, generates a first multiplication value obtained by multiplying the set representative point group for updating by a coefficient (1−k) and a second multiplication value obtained by multiplying the representative point group output from the tone curve pattern updater in an immediately preceding frame of the current frame by a coefficient k, and outputs a combined representative point group obtained by adding the first multiplication value and the second multiplication value as the updated representative point group; and if the scene change is detected by the scene change detector, in the frame in which the count value of the frame counter is reset to the initial value, outputs the representative point group of the tone curve pattern selected in the current frame in which the count value is reset to the initial value as the updated representative point group.

2. The video signal processing device according to claim 1, wherein the gradation analyzer divides the gradation of the video signal into a plurality of classes, and based on a luminance histogram indicating a frequency of the luminance of each class, analyzes the distribution of the gradation.

3. The video signal processing device according to claim 2, wherein the scene change detector detects whether the scene change of the video signal has occurred based on the luminance histogram.

4. The video signal processing device according to claim 1, wherein the coefficient k takes a value exceeding 0.5.

5. A video signal processing method comprising:

analyzing a distribution of a gradation of an image of each frame of an input video signal in a range from a low gradation side to a high gradation side;

selecting any one of a plurality of tone curve patterns that determine a relationship between a gradation of the video signal and luminance of the image in accordance with the analyzed distribution of the gradation of the image;

detecting whether a scene change of the video signal has occurred;

counting from an initial value to a predetermined value correspondingly with a progression of the frame of the video signal by a frame counter, and if a count value reaches the predetermined value, resetting the count value to the initial value, and in a case where the scene change is detected, even if the count value has not reached the predetermined value, resetting the count value to the initial value;

generating and outputting an updated representative point group of the tone curve pattern in each frame;

performing a spline interpolation on the output representative point group and generating a tone curve pattern subjected to the spline interpolation, if the scene change is not detected, in each frame until the count value of the frame counter reaches the predetermined value, setting the representative point group of the tone curve pattern selected in the most recent frame in which the count value is reset to the initial value as a representative point group for updating, by assuming that k is a predetermined positive coefficient of less than 1, generating a first multiplication value obtained by multiplying the set representative point group for updating by a coefficient (1−k) and a second multiplication value obtained by multiplying the representative point group output in an immediately preceding frame relative to a current frame by a coefficient k, and outputting a combined representative point group obtained by adding the first multiplication value and the second multiplication value as the updated representative point group;

if the scene change is not detected, in a next frame in which the count value is reset to the initial value of a frame in which the count value of the frame counter reaches the predetermined value, setting the representative point group of the tone curve pattern selected in the current frame in which the count value is reset to the initial value as a representative point group for updating, generating a first multiplication value obtained by multiplying the set representative point group for updating by a coefficient (1−k) and a second multiplication value obtained by multiplying the representative point group output in an immediately preceding frame of the current frame by a coefficient k, and outputting a combined representative point group obtained by adding the first multiplication value and the second multiplication value as the updated representative point group; and if the scene change is detected, in the frame in which the count value of the frame counter is reset to the initial value, outputting the representative point group of the tone curve pattern selected in the current frame in which the count value is reset to the initial value as the updated representative point group.

\* \* \* \* \*